United States Patent

Reeves et al.

[11] Patent Number: 5,561,827
[45] Date of Patent: Oct. 1, 1996

[54] COATED NICKEL-BASE SUPERALLOY ARTICLE AND POWDER AND METHOD USEFUL IN ITS PREPARATION

[75] Inventors: Jim D. Reeves, Cincinnati; David E. Budinger, Milford; Robert A. Anderson, Loveland, all of Ohio

[73] Assignee: General Electric Company, Cincinnati, Ohio

[21] Appl. No.: 365,631

[22] Filed: Dec. 28, 1994

[51] Int. Cl.$^6$ .................................................. B22F 7/02
[52] U.S. Cl. .................. 419/5; 419/8; 419/9; 419/10; 419/11; 419/12; 419/32; 419/39
[58] Field of Search .................................... 419/5, 8, 9, 10, 419/11, 12, 32, 39

[56] References Cited

U.S. PATENT DOCUMENTS

| | | | |
|---|---|---|---|
| 4,073,639 | 2/1978 | Duvall et al. | 75/0.5 R |
| 4,830,934 | 5/1989 | Ferrigno et al. | 428/678 |
| 4,842,953 | 6/1989 | Perkins et al. | 428/553 |
| 4,937,042 | 6/1990 | Perkins et al. | 419/8 |
| 5,240,491 | 8/1993 | Budinger et al. | 75/255 |

*Primary Examiner*—Donald P. Walsh
*Assistant Examiner*—John N. Greaves
*Attorney, Agent, or Firm*—Andrew C. Hess; David L. Narciso

[57] ABSTRACT

A nickel-base superalloy article has a coating having a composition, in weight percent, of from about 10 to about 20 percent cobalt, from about 14 to about 25 percent chromium, from about 2 to about 12 percent aluminum, from 0 to about 0.2 percent yttrium, from about 0.001 to about 3 percent boron, from about 1 to about 10 percent silicon, balance nickel and incidental impurities. The coating is preferably applied by mixing together two powders, one with a higher solidus temperature and one with a lower solidus temperature, whose net composition is that of the coating. The powder mixture is compacted with a binder, applied to a surface of the article, and heated to a temperature above the lower solidus temperature.

10 Claims, 2 Drawing Sheets

COATED NICKEL-BASE SUPERALLOY ARTICLE AND POWDER AND METHOD USEFUL IN ITS PREPARATION

BACKGROUND OF THE INVENTION

This invention relates to superalloy articles such as used in aircraft gas turbine engines, and, more particularly, to such an article having an abradable, thermally densified coating applied thereto.

In an aircraft gas turbine (Jet) engine, air is drawn into the front of the engine, compressed by a shaft-mounted compressor, and mixed with fuel. The mixture is burned, and the hot exhaust gases are passed through a turbine mounted on the same shaft. The flow of hot exhaust gas turns the turbine, which turns the shaft and provides power to the compressor. The hot exhaust gas flows from the back of the engine, driving it and the aircraft forwardly.

The turbine includes a turbine disk and a large number of turbine blades extending radially therefrom. The hot exhaust gas is directed against the turbine blades. To prevent leakage of hot gas past the tips of the turbine blades, the turbine has a stationary shroud that acts in the manner of a tunnel at the perimeter of the turbine. A seal is provided on the inner surface of the shroud to minimize hot gas leakage. It is common practice to form at least the sealing portion of the shroud from an abradable alloy. The clearance between the turbine blade tips and the seal is made to a tightly controlled tolerance. The clearance is designed to be minimal at steady state operating conditions. During takeoff and thrust reverser conditions, some incursion of the blade against the shroud may occur, with the shroud being a sacrificial component that is worn away as necessary by the rubbing of the blade tips.

After the gas turbine engine has been in service, there is a gradual wearing away of the tips of the turbine blades by hot gas erosion. As this wear continues, the clearance with the shroud, and the amount of hot exhaust gas leakage, gradually increases. The result is decreased engine efficiency. It is therefore common practice to refurbish the shroud by adding a coating of an alloy to the inner surface of the shroud. The sealing described above is again achieved, and efficiency is restored.

The hotter the exhaust gas, the more efficient is the operation of the gas turbine. The maximum operating temperatures of gas turbines has therefore gradually increased over the years as a result of improvements in engine design and the materials of construction. One area of improvement has been to use shrouds made of nickel-base superalloys rather than cobalt-base superalloys. The nickel-base super alloy shrouds are desirably made of materials with directionally oriented microstructures achieved by directional solidification, which can be used at higher temperatures than conventional non-directional microstructures.

Materials for use on shrouds having non-directional microstructures are well known. It has been found that these materials do not function well for refurbishment of shrouds made of nickel-base superalloys having directional microstructures, which operate at temperatures above the capability of the available materials. The current cobalt-base materials used in shroud refurbishment are incompatible with the directionally oriented nickel-base shrouds for the temperatures at which the shroud is operating.

There is a need for seal materials operable with nickel-base superalloys having directional microstructures, either oriented polycrystals or single crystals. The present invention fulfills this need, and further provides related advantages.

SUMMARY OF THE INVENTION

The present invention provides an article made of a nickel-base superalloy having a directionally oriented microstructure, and further having a coating of a seal material thereon. The coating is fully operable at the temperatures achieved by the directionally oriented microstructures, without incipient melting, excessive oxidation or corrosion, or excessive interdiffusion with the substrate. It can abrade as necessary. The coating is conveniently applied using powder metallurgy techniques to prepare a preform that is thereafter brazed into place.

In accordance with the invention, an article comprises a substrate comprising a nickel-base superalloy having a directionally oriented microstructure, and a coating on a surface of the substrate. The coating has a composition, in weight percent, consisting essentially of from about 10 to about 20 percent cobalt, from about 14 to about 25 percent chromium, from about 2 to about 12 percent aluminum, from 0 to about 0.2 percent yttrium, from about 0.001 to about 3 percent boron, from about 1 to about 10 percent silicon, balance nickel and incidental impurities.

The coat is preferably prepared by providing two prealloyed precursor powders. The first prealloyed precursor powder has a composition, in weight percent, of from about 10 to about 20 percent cobalt, from about 14 to about 25 percent chromium, from about 2 to about 12 percent aluminum, from about 0 to about 0.2 percent yttrium, balance nickel and incidental impurities. The second prealloyed precursor powder has a composition, in weight percent, of from about 10 to about 20 percent cobalt, from about 14 to about 25 percent chromium, from about 2 to about 12 percent aluminum, from about 0.001 to about 3 percent boron, from about 2 to about 12 percent silicon, balance nickel and incidental impurities.

The two prealloyed precursor powders are mixed together in the proper proportions, so that the net composition is that of the final coating. The first prealloyed precursor powder is preferably present in an amount of from about 60 to about 75 percent by weight of the total, with the second prealloyed precursor powder present as the balance of the mixture. The mixture is applied to the surface of the substrate. The application is preferably made by mixing the precursor powders with a binder, pressing the resulting mixture to a compact of a desired shape, and adhering the compact to the surface of the substrate. The mixture and substrate are heated to a temperature above the solidus temperature of the second prealloyed precursor powder, forming a 1lquid phase that brazes the compact to the surface.

This invention provides an advance in the art of refurbishment of gas turbine engines which use directionally oriented superalloy components. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
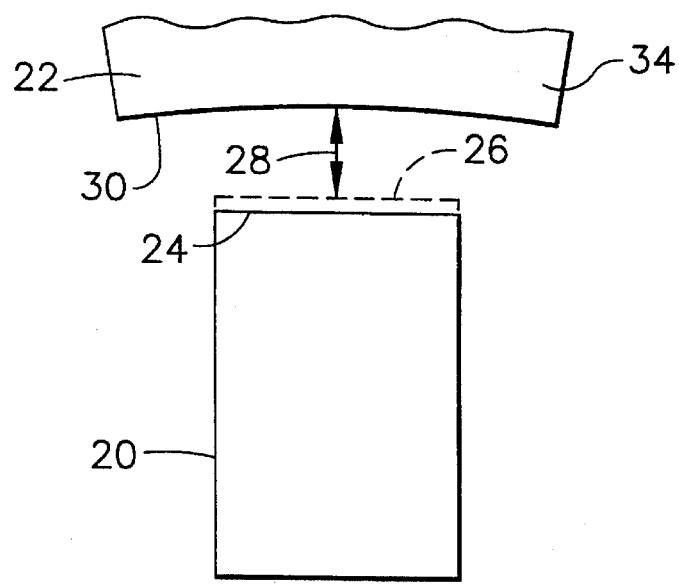
FIG. 1 is a fragmented view of a turbine blade tip in relation to a shroud, prior to refurbishment.
Figure 2:
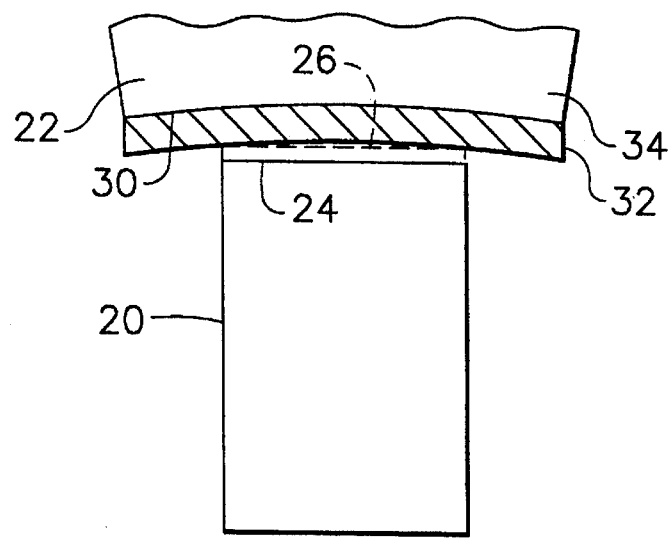
FIG. 2 is a view of the structure shown in FIG. 1, after refurbishment.

FIGS. 1 and 2 illustrate, In fragmented view, a gas turbine blade 20 and a cooperating shroud 22. The gas turbine blade 20 is mounted on a turbine disk (not shown), which In turn is mounted on a turbine shaft (not shown) so that the turbine blade 20 can rotate past the shroud 22 when the gas turbine operates. The shroud 22 is mounted to a support structure (not shown). At rest, the turbine blade 20 has a length Indicated by a solid line 24. When the gas turbine operates, the gas turbine blade extends in length to an extended position Indicated in dashed lines, numeral 26, due to thermal expansion and centrifugal forces.

FIG. 1 shows the condition of the turbine blade 20 and the shroud 22 after a substantial amount of operation, such that there is a gap 28 between the extended position of the gas turbine blade 20 and an inwardly facing surface 30 of the shroud 22. Hot exhaust gas can leak through this gap 28 without acting against the turbine blade 20, thereby reducing the efficiency of the gas turbine engine. This condition, when sufficiently advanced, calls for refurbishment of the shroud.

In FIG. 2, a coating 32 has been applied to the inwardly facing surface 30 of the shroud 22 during refurbishment of the shroud. The coating 32 extends to a height above the surface 30 such that there is a considerable gap between the end of the turbine blade 20 and the coating 32, when the turbine blade is at rest and is at its rest length 24. However, when the engine is started and the turbine blade 20 lengthens to its extended length 26, the gap between the end of the turbine blade 20 and the coating 32 (and thence the shroud 22) becomes very small and acceptable in the operation of the engine. In a newly refurbished shroud and turbine unit, the refurbished size of the clearance gap between the extended length 26 of the turbine blade 20 and the coating 32 and shroud 22 is a few thousandths of an inch.

Figure 3:
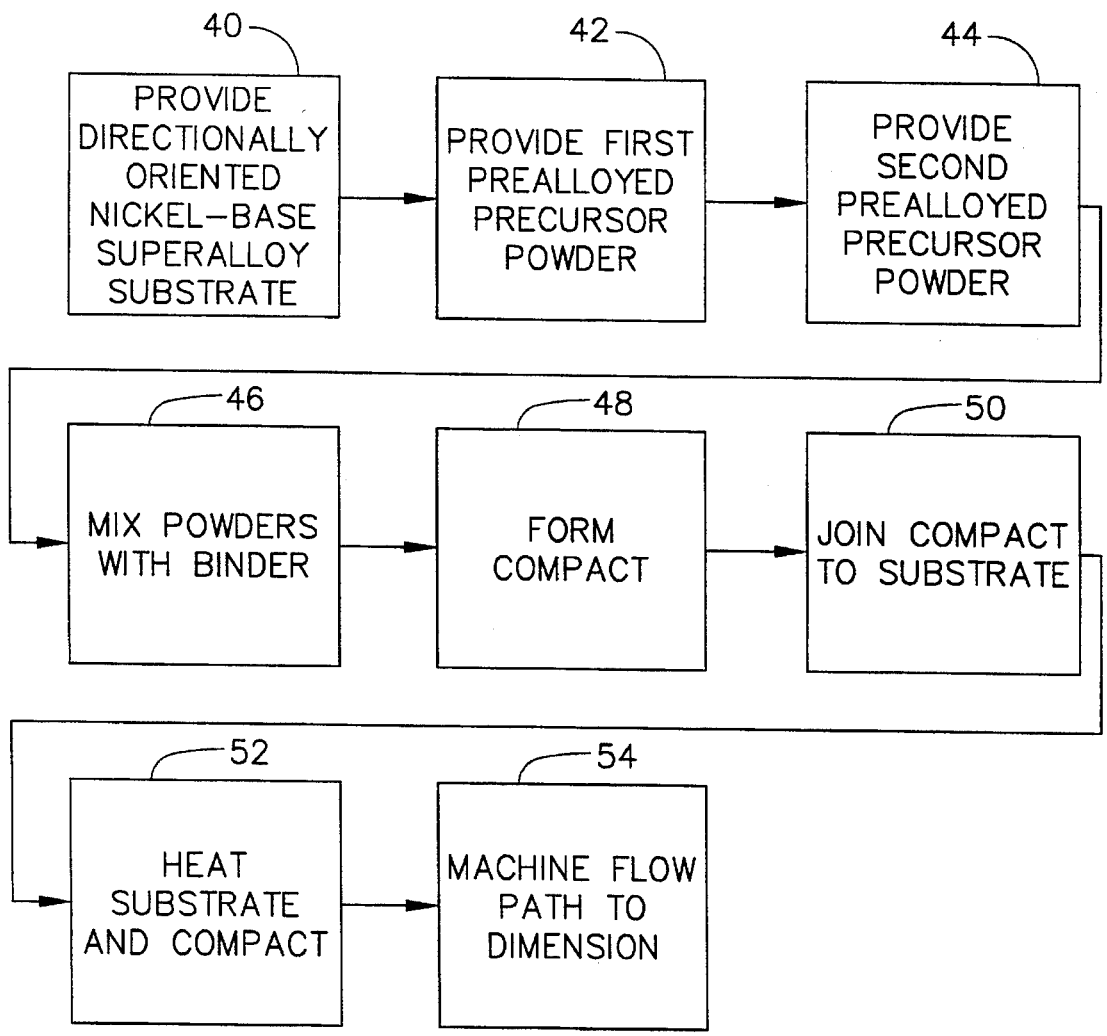
FIG. 3 is a block diagram illustrating the method of the invention.

FIG. 3 illustrates a preferred method for refurbishing the shroud 22 with the coating 32 in the manner illustrated in FIG. 2. A directionally oriented nickel-base superalloy substrate 34 is provided, numeral 50. In the case illustrated In FIGS. 1 and 2, the substrate 34 is the inwardly facing surface 30 of the shroud 22, but the invention can be used in conjunction with other substrates as well. If necessary, the substrate is cleaned prior to further processing to remove oxides and other residue on the surface. One method for accomplishing the cleaning is fluoride ion cleaning, as described in U.S. Pat. No. 4,098,450, whose disclosure is incorporated by reference.

The substrate 34 is formed of a nickel-base superalloy. As used herein, a nickel-base superalloy is a material composition having at least about 50 weight percent nickel and alloying elements added to make it suitable for structural applications at temperatures approaching its melting point. A number of nickel-base superalloys are known in the art and are operable in conjunction with the present invention. The preferred such nickel-base superalloy for use with the present invention is termed N5 alloy, which has a nominal composition, in weight percent, of about 7.5 percent cobalt, 7 percent chromium, 6.2 percent aluminum, 0.004 percent boron, 1.5 percent molybdenum, 5.5 percent tantalum, 5 percent tungsten, 0.15 percent hafnium, 0.05 percent carbon, 3 percent rhenium, balance nickel and incidental impurities.

The substrate 34 has a directionally oriented microstructure. As used herein, a directionally oriented microstructure is one having a common crystal orientation throughout the pertinent region of the substrate. The microstructure can be a single crystal or an oriented polycrystal. In the latter case, there is more than one crystal or grain in the microstructure, but all of the crystals have at least one common crystal orientation. For nickel-base superalloys, the common crystal orientation is typically a [001] direction. Methods for producing directionally oriented microstructures are well known in the art, and typically include directionally solidifying the article from a common point or from a seed having the desired orientation. In the case of a single crystal, substantially the entire article is a single grain. In the case of a directionally oriented polycrystal, there are typically at least several elongated grains, with a [001] crystallographic direction parallel to the direction of elongation of the grains. It will be appreciated that minor areas of irregularity can exist within the article, but that the article will still be considered a directionally oriented microstructure for the present purposes.

That the article is a nickel-base superalloy with a directionally oriented microstructure is significant to the nature of the present invention for several reasons. In the past, articles such as shrouds were often made of cobalt-base superalloys, which have different composition and physical characteristics than the nickel-base superalloys. The coating materials operable on cobalt-base superalloys are typically not satisfactory for use on nickel-base superalloys. Secondly, the present article has a directionally oriented microstructure, which permits it to operate at higher temperatures than an article which does not have a directionally oriented microstructure. Prior coating materials are typically not satisfactory for use at these higher operating temperatures.

As an example, a prior coating material for refurbishment of MarM509 (having a composition, in weight percent, of 10 percent nickel, 22.5 percent chromium, 0.2 percent titanium, 3.5 percent tantalum, 7 percent tungsten, 0.6 percent carbon, 0.05 percent zirconium, balance cobalt) article substrates, which are equiaxed and do not have a directionally oriented microstructure, is an alloy termed TDC CoNICrAlY. This prior coating material has a composition, In weight percent, of 34 percent nickel, 22 percent chromium, 7 percent aluminum, 0.05 percent yttrium, 3.3 percent silicon, balance cobalt. Tests using this coating material on directionally oriented N5 alloy established that the prior coating material was Incompatible with the N5 substrate and could not withstand extended exposure at which the directionally oriented N5 alloy can operate. This prior coating material interdiffused too extensively into the substrate, resulting in crystallization of the directionally oriented N5 alloy structure and a consequent reduction in its properties.

To overcome this problem, a new coating alloy for directionally oriented nickel-base superalloys has been developed. This coating alloy has a composition, in weight percent, consisting essentially of from about 10 to about 20 percent cobalt, from about 14 to about 25 percent chromium, from about 2 to about 12 percent aluminum, from 0 to about 0.2 percent yttrium, from about 0.001 to about 3 percent boron, from about 1 to about 10 percent silicon, balance nickel and incidental impurities. Most preferably, the coating alloy has a composition of from about 14 to about 16 percent cobalt, from about 19 to about 21 percent chromium, from about 7 to about 8.5 percent aluminum, from about 0.02 to about 0.11 percent yttrium, from about 0.001 to about 0.2 percent boron, from about 2.2 to about 2.5 percent silicon, balance nickel.

In this coating alloy, the cobalt content may not be less than about 10 weight percent, because the effect of lattice mismatch leading to solid solution strengthening of the coating is lost, and may not be more than about 20 weight percent, because interdiffusion of the cobalt in to the substrate can lead to crystallization and loss of the benefits of the directionally oriented substrate structure. This latter consideration is important. Larger amounts of cobalt, added In one or more refurbishments, can lead to the formation of a crystallized region in the (otherwise directionally oriented) nickel-base superalloy. The value of the directionally oriented is thereafter lost, at least in part.

The chromium content may not be less than about 14 weight percent, because oxidation resistance and corrosion resistance become insufficient, and may not be more than about 25 weight percent, because of the possibility of the formation of brittle sigma phase with extended elevated-temperature exposure. The aluminum content may not be less than about weight percent, because oxidation resistance of the coating becomes Insufficient, and may not be more than about 12 weight percent, because of the difficulty in brazing the coating. (Even in a high vacuum, a high aluminum content can cause surface oxidation that prevents wetting of the compact to the substrate.)

The yttrium content may be zero, but is preferably not less than about 0.02 weight percent, because of Its beneficial effect on oxidation resistance. The yttrium content may not be more than about 0.2 weight percent, because only trace amounts are required to achieve the improved oxidation resistance. The boron is present as a melting-point depressant, and is provided In an amount consistent with this objective. It would normally be present In a trace amount of at least about 0.001 percent. The boron level is maintained at a low value, not more than about 3 weight percent, because Its presence dramatically decreases oxidation resistance, Silicon Is also present as a melting-point depressant, and additionally it contributes to improved oxidation resistance. The silicon content may not be less than about 1 weight percent, because its depressant effect on the melting point is insufficient, and may not be more than about 10 weight percent, because excess melting-point depression causes a loss in temperature capability of the final coating composition. The balance of the alloy is nickel, for compatibility with the nickel-base substrate. Incidental amounts of impurities such as are often found in nickel-base superalloys are permitted.

In the preferred method of practicing the invention, the coating alloy is provided in the form of two precursor alloys that are melted and alloyed together by liquid phase sintering during the application process. The two precursor alloys are selected so as to be readily compatible, but to have the boron and silicon melting-point depressants provided in the second precursor alloy. The precursor alloys are preferably provided in the form of prealloyed powders that are blended together during processing and later melted together.

A first prealloyed precursor powder is provided, numeral 42. The first prealloyed precursor powder preferably has a composition of from about 10 to about 20 percent cobalt, from about 14 to about 25 percent chromium, from about 2 to about 12 percent aluminum, from 0 to about 0.2 percent yttrium, balance nickel and incidental impurities. A second alloy precursor is provided, numeral 44. The second prealloyed precursor powder preferably has a composition of from about 10 to about 20 percent cobalt, from about 14 to about 25 percent chromium, from about 2 to about 12 percent aluminum, from about 0.001 to about 3 percent boron, from about 2to about 12 percent silicon, balance nickel and incidental impurities. The compositions of the prealloyed precursor powders are similar, but not necessarily identical, as to cobalt, chromium, and aluminum. The yttrium is provided in the first prealloyed precursor powder, and the boron and silicon are provided in the second prealloyed precursor powder.

The boron and silicon both tend to depress the solidus temperature of the second prealloyed precursor powder. The first prealloyed precursor powder discussed above has a solidus temperature of about 2400° F., and the second prealloyed precursor powder discussed above has a solidus temperature of about 2000° F. These solidus temperatures vary according to the precise composition, but, as is apparent, the presence of the melting point depressants in the second prealloyed precursor powder leads to significant difference in their solidus temperatures.

The first alloy precursor and the second alloy precursor are present in a proportion sufficient to produce the desired final composition of the coating and also have the desired flow properties at the subsequently used brazing temperature. In a preferred application, the first prealloyed precursor powder had a composition, in weight percent, of 55.9 percent nickel, 15.0 percent cobalt, 20.0 percent chromium, 9.0 percent aluminum, and 0.1 percent yttrium, with a solidus temperature of about 2400° F. The second prealloyed precursor powder had a composition, in weight percent, of 52.5 percent nickel, 15.0 percent cobalt, 20.0 percent chromium, 5.0 percent aluminum, 7.0 percent silicon, and 0.5 percent boron, with a solidus temperature of about 2000° F. For this preferred case, about 66.7 percent by weight of the first powder was mixed with about 33.3 percent by weight of the second powder. This selection was made on the basis of the flow properties of the mixture at 2250° F., the selected brazing temperature.

The sizes of the powders are not critical, as long as they are sufficiently small to permit Interdiffusion at the brazing temperature in the time permitted for brazing. In the preferred case, the first and second prealloyed precursor powders each have a size of −140/+325 mesh.

The powders may be applied to the substrate In any operable manner. In a preferred approach, producing a highly controlled coating, the powders In the selected proportion are mixed with a binder, numeral 46. The binder is an organic material that holds the powders together In a selected shape for initial handling, but later burns away during brazing. The binder is preferably Nicrobraze 520 and Nicrobraze 1000. In the preferred approach, for each 100 grams of the powder mixture, about 10 grams of the binder is mixed with the metal powders. This ratio, however, is not critical. The metal powders and the binders are mixed and dried until the volatile constituents of the binders are evaporated, leaving a dry powder-binder system.

The mixture of metal powders and binder is pressed to form a compact, numeral 48. In the preferred approach, the compact has the mildly curved shape that conforms to that of the inwardly facing surface 30 and has a thickness as described previously. A cold pressing pressure of about 110,000 to about 175,000 pounds per square inch has been found sufficient. The compact may be presintered, but that has not been found necessary.

The compact is Joined to the substrate, numeral 50, preferably by an adhesive. Adhesives such as Borden's SAF-T have been found suitable. Other joining procedures, such as spot welding of a presintered compact, could also be used.

The compact and substrate are heated to a brazing temperature, numeral 52. The brazing temperature is greater than the solidus temperature of the second prealloyed precursor powder and, preferably, less than the solidus temperature of the first prealloyed precursor powder. In the preferred embodiment, brazing is preferably performed at a temperature of from about 2235° F. to about 2325° F., most preferably about 2250° F., for a time of about 2 hours, in vacuum. During brazing, the compact densifies and bonds to the substrate.

The substrate 34 and compact brazed thereto, which becomes the coating 32, are nearly of the correct size to achieve the desired close tolerances between the extended length of the turbine blade and the shroud with the coating applied thereon. Typically, however, some final machining is required, numeral 54, so that the flow path of the shroud has the correct dimensions.

Various types of further processing may be used In specific applications. For example, if the shroud substrate and any cooling passages therein require additional oxidation and corrosion protection, they may be treated by aluminiding or other process known in the art. There may also be an optional ageing, such as 1975° F. for four hours followed by 1650° F. for four hours.

The following examples are presented to illustrate various aspects of the Invention, but the examples should not be interpreted as limiting of the Invention In any respect.

Specimens for various types of testing were prepared according to the preferred approach discussed above and tested.

For metallographic studies, a coating was brazed to the directionally oriented N5 substrate, sectioned, and polished. The results showed that, under the brazing conditions, the coating alloy interdiffused into the substrate by a maximum of about 0.006 inches. The significance of this interdiffusion is that a diffusional metallurgical bond was formed between the substrate and the coating, but that the Interdiffusion was not so extensive as to cause crystallization in the substrate.

For the study of mechanical properties, the coating material was placed between two flat plates in a butt-Joint configuration, with the thickness of the coating 0.01 inches. The butt-Joined configuration was brazed at 2250° F. for 2 hours. Three specimens were tensile tested at 1600° F. The specimens exhibited an average ultimate tensile strength of 70,000 pounds per square inch and an elongation of 0.1 percent. Three specimens were stress-rupture tested at 2000° F. with an applied load of 4000 pounds per square inch. The times to failure ranged from 0.6 to 13.4 hours. Two specimens were stress-rupture tested at 1700° F. with an applied load of 25,000 pounds per square inch. The times to failure were 7.8 and 8.6 hours.

Static oxidation tests were conducted with the preferred coating applied to a coupon of N5 alloy at a temperature of 2150° F. for 500 hours. For comparison, the same tests were performed on MarM509 alloy coated with a prior coating material, the MarM509 TDC described previously. The present approach exhibited no attack and improved oxidation resistance as compared with the prior approach.

Rub testing was performed using the preferred coating applied to standard rub blocks. The rub testing was conducted at a speed of 1400 feet per second, 10 second incursions at 0.002 inch per rub, and a temperature of 1800° F. The coating material of the invention was found to be more abradable than N5 alloy, making it suitable for the application of an abradable coating on a shroud.

Thermal shock specimens were prepared by coating the front sides of buttons of N5 alloy with the preferred coating. The coating was thereafter ground to about 0.040 inches thick. The buttons were rapidly heated to 2050° F. and thereafter rapidly cooled to below 300° F. The back sides of the buttons were cooled to produce a temperature gradient of about 275° F. between the front and back sides. The buttons were tested for a total of 2000 cycles using this approach and periodically inspected. There was no delamination or spalling observed in any of the buttons.

The present approach is therefore suitable for the coating of articles of nickel-base superalloys having a directionally oriented microstructure. This invention has been described in connection with specific embodiments and examples. However, those skilled in the art will recognize various modifications and variations of which the present invention 1s capable without departing from its scope as represented by the appended claims.

What is claimed is:

1. A method for coating an article, comprising the steps of
providing a substrate comprising a nickel-base superalloy having a directionally oriented microstructure;
providing a first alloyed precursor powder comprising, in weight percent, from about 10 to about 20 percent cobalt, from about 14 to about 25 percent chromium, from about 2 to about 12 percent aluminum, from 0 to about 0.2 percent yttrium, balance nickel and Incidental Impurities, the first prealloyed precursor powder having a first solidus temperature;
providing a second prealloyed precursor powder comprising, in weight percent, from about 10 to about 20 percent cobalt, from about 14 to about 25 percent chromium, from about 2 to about 12 percent aluminum, from about 0.001 to about 3 percent boron, from about 2 to about 12 percent silicon, balance nickel and Incidental impurities, the second prealloyed precursor powder having a second solidus temperature less than the first solidus temperature, the first prealloyed precursor powder and the second prealloyed precursor powder being present in a proportion sufficient to produce the composition of the coating;
mixing the first prealloyed precursor powder and the second prealloyed precursor powder together to form a coating mixture;
applying the coating mixture to a surface of the substrate; and
heating the substrate and coating mixture to a temperature above the second solidus temperature.

2. The method of claim 1, wherein the step of providing a substrate includes the step of
providing a substrate having a nominal composition of about 7.5 percent cobalt, 7 percent chromium, 6.2 percent aluminum, 0.004 percent boron, 1.5 percent molybdenum, 6.5 percent tantalum, 5 percent tungsten, 0.15 percent hafnium, 0.05 percent carbon, 3 percent rhenium, balance nickel and incidental Impurities.

3. The method of claim 1, wherein the step of providing a substrate includes the step of
providing a substrate having a single-crystal microstructure.

4. The method of claim 1, wherein the step of mixing includes the step of
mixing from about 60 to about 75 weight percent of the first prealloyed precursor powder together with from about 40 to about 25 weight percent of the second prealloyed precursor powder, the total of the weight percents of the first prealloyed precursor powder and the second prealloyed precursor powder being 100 percent.

5. The method of claim 1, wherein the step of mixing includes the step of mixing sufficient proportions of the first prealloyed precursor powder and the second prealloyed precursor powder to achieve a net composition, in weight percent, of from about 10 to about 20 percent cobalt, from about 14 to about 25 percent chromium, from about 2 to about 12 percent aluminum, from 0 to about 0.2 percent yttrium, from about 0.001 to about 3 percent boron, from about 1 to about 10 percent silicon, balance nickel and incidental Impurities.

6. The method of claim 1, wherein the step of mixing Includes the step of mixing sufficient proportions of the first prealloyed precursor powder and the second prealloyed precursor powder to achieve a net composition, in weight percent, of from about 14 to about 15 percent cobalt, from about 19 to about 21 percent chromium, from about 7 to about 8.5 percent aluminum, from about 0.02 to about 0.11 percent yttrium, from 0.001 to about 0.2 percent boron, from about 2.2 to about 2.5 percent silicon, balance nickel.

7. The method of claim 1, wherein the step of mixing includes the step of mixing the first prealloyed precursor powder and the second prealloyed precursor powder together with a binder to form the coating mixture.

8. The method of claim 7, wherein the step of applying includes the step of pressing the coating mixture together to form a compact; and Joining the compact to a surface of the substrate.

9. The method of claim 8, wherein the step of joining includes the step of applying an adhesive to at least one of the compact and the surface.

10. The method of claim 1, the step of heating including the step of heating the substrate to a temperature of from about 2235° F. to about 2325° F.

* * * * *